April 18, 1961  F. C. SCHWANEKE  2,980,405
EJECTOR BEATER
Filed Aug. 27, 1957
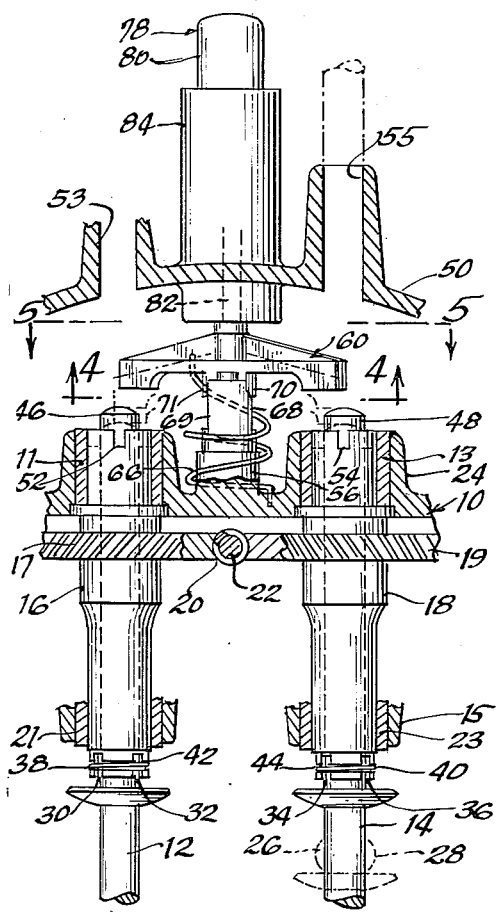
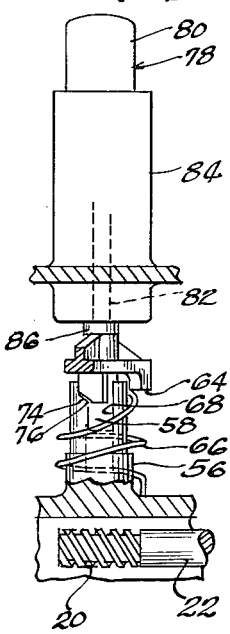
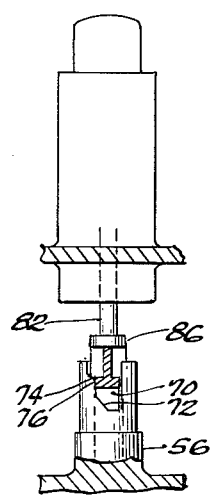
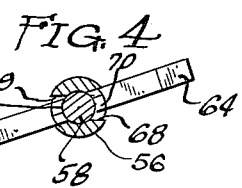
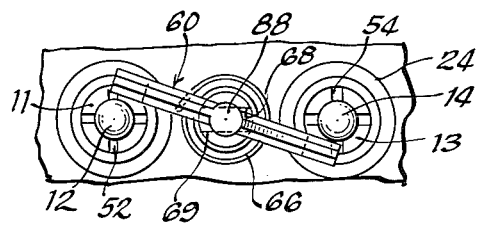
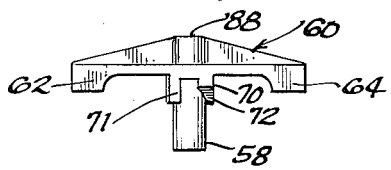
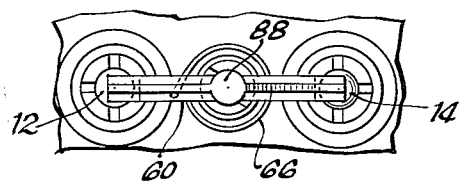
INVENTOR.
Fred C. Schwaneke
BY
Watson D. Harbaugh
Attorney United States Patent Office 2,980,405
Patented Apr. 18, 1961

2,980,405

EJECTOR BEATER

Fred C. Schwaneke, Chicago, Ill., assignor to Dormeyer Corporation, Chicago, Ill., a corporation of Illinois Filed Aug. 27, 1957, Ser. No. 680,558

8 Claims. (Cl. 259—1)

This invention relates to household food mixers, and more particularly to an improved beater ejector mechanism for disconnecting mixer tools from the mixer power unit.

Household food mixers usually comprise a stand or base, a mixing bowl adapted to be supported on one end of the base, and an electric motor power unit supported on the opposite end of the base so as to overhang the bowl. The mixing beaters, usually two in number, are carried by the power unit and extend downwardly into the bowl, their lower ends being so shaped as to agitate or stir the mix when they are rotated. In most household mixers the beater shafts are parallel and spaced a predetermined distance apart, the lower ends of the beaters having spaced blades which interdigitate as the beaters are rotated in opposite directions. The upper ends or shafts of the beaters are usually received in rotary drive relationship in rotatable cylindrical spindles journalled in the power unit, the spindles being driven by the electric motor through appropriate gears.

In most constructions the beaters are removable from the spindles so that they may be readily cleaned after each use. Various devices have been provided for releasably supporting the beaters in the spindles in drive relationship. Generally, the relationship is such that the beaters are keyed to the spindles when pressed upwardly therein and are relased when pulled downwardly. Frictional elements may be used to hold the beaters in their working positions, but in most cases some sort of spring retainer is employed which resists slight downward pull, but yields under greater force.

The ejector mechanism of this invention may be readily adapted for use in practically any mixer in which a downward force is employed, either to disengage the beaters completely and permit them to drop freely out of the spindles or simply to declutch them from the spindles to terminate the drive relationship after which they can be withdrawn the remaining distance easily by hand.

Although various types of beater ejectors have been available heretofore, these have involved either complex constructions which were difficult and expensive to manufacture and operate or have required elements for effecting downward force which were subject to breakdown and required close manufacturing tolerances.

Accordingly, it is an object of the present invention to provide a beater ejector in which the parts are of simple, rugged construction, providing continuous and uniform operation in a direct manner.

Another object of the invention is to provide a beater ejector as described, adapted to eject a pair of beater blades simultaneously while avoiding interference with the blades during operation.

Another object of the invention is to provide a combination mixer and juicer in which a beater ejector is mounted for relative angular rotation by means of a torsion spring secured thereto and to the utensil, so that in its inoperative position the ejector is displaced rotationally to an extent sufficient to permit one of the blades to be inserted in a hollow shaft therefor in upright position to serve as a juicer.

Another object of the invention is to provide a beater ejector as described, in which a T-shaped ejector bar having a pair of depending ejector heads at its ends is carried by a shaft slidably mounted in the utensil and biased upwardly by the spring means into the inoperative position.

Another object of the invention is to provide a beater ejector as described in which the means for slidably mounting the T-shaped ejector head includes a hollow shaft defining cam means adapted to cooperate with cam means on a shaft for the T-shaped member to afford guided downward movement effecting rotation of the T-shaped element into contact with the ends of beater blade shafts to be ejected and rotation in the opposite direction by the said spring means to place the T-shaped member in a position which will not interfere with positioning of one of the beater blades for use as a juicer, selectively.

Another object of the invention is to provide a manually actuable, upwardly biased plunger slidably mounted in the utensil for registration with the T-shaped ejector member so that the T-shaped member may be cammed into registration with the ends of the shafts as described to eject the said shafts.

Other objects and advantages of the invention will become apparent as the description proceeds in accordance with the drawings, in which:

Fig. 1 is a side elevational view of an assembly for use in a mixer and juicer as shown in simplified form, according to the present invention;

Fig. 2 is a simplified view corresponding to the view of Fig. 1 and taken at right angles thereto;

Fig. 3 is a view corresponding to the view of Fig. 2, showing the device in beater-ejecting position;

Fig. 4 is a horizontal sectional view taken along the lines 4—4 of Fig. 1;

Fig. 5 is a horizontal sectional view taken along the lines 5—5 of Fig. 1;

Fig. 6 is a view corresponding to the view of Fig. 5 showing the ejector in operating relationship to beater blades to be ejected; and Fig. 7 is a showing of a T-shaped beater release head according to the invention.

Referring now to Fig. 1, an assembly 10 is shown representing in simplified form support means for rotatably receiving a pair of beater shafts 12 and 14 on a support block 15 adapted to be secured in a housing disposed above the mixer bowl or the like and provided with suitable motor means and gear means for rotating a pair of hollow sleeve shafts or spindles 16 and 18 having worm gears 17 and 19 or the like adapted to cooperate with a worm 20 on a motor shaft 22. Each of the rotatable shafts 16 and 18 is journalled as by bearings 11 and 13 in a gear housing cover 24 on the gear housing 15 as disposed in spaced parallel relation and at the lower ends 21 and 23 thereof in the sleeve shafts 16 and 18 that are journalled in bearings and slotted vertically to receive arcuate lugs below the housing 15 such as the lugs 26 and 28 of shaft 14 in slots 30, 32, 34 and 36. Four slots are provided to receive the two lugs 26 and 28 in any one of four ways at right angles to each other and to maintain the blades on the shafts 12 and 14 in interdigitating relationship. When the beater shafts are mounted within the sleeve shafts 16 and 18, as shown in Fig. 1, C-springs 38 and 40 disposed in annular slots 42 and 44 on the sleeve shafts prevent downward movement of the shafts 12 and 14 yet afford cammed release of the shafts as cammed by the lugs 26 and 28 when the blades are forced downwardly. In their secured position the shafts 12 and 14 extend upwardly beyond the sleeve shafts 16 and 18 at their upper ends 46 and 48 for an appreciable distance sufficient to effect release of the shafts when the ends thereof are moved downwardly to a level corresponding to the upper ends of the shafts 16 and 18.

The upper ends 46 and 48 may have an internal diameter slightly less than that of the lower ends receiving the blades in beater position and a cover member 50 on the assembly 10 is at their upper ends; the sleeve shafts 16 and 18 are castellated as at 52 and 54 to receive a juicer shaft (not shown) through one of the openings 53 or 55 provided in the motor housing concentric with the sleeve shafts when the corresponding one of the beater shafts 12 and 14 is removed. The juicer shaft is inserted through the apertures 53 and 55 and thence into the sleeves 16 and 18 to provide a juicer arrangement and like the beater shafts has drive lugs thereon engaging in the castellations 52 or 54 in a relationship driven therefrom.

In order to eject the beater shafts 12 and 14, a vertical hollow sleeve 56 is mounted on gear housing cover 24 to receive therein in slidable, journalled relationship a shaft 58 on which is secured a T-shaped ejector head 60, having depending actuating elements 62 and 64 radially spaced from the central shaft 58 a distance sufficient to place them in registration with the upper ends of the shafts 12 and 14 as hereinafter described.

The head 60 is biased upwardly by a torsion spring 66 having its lower end secured to the housing cover 24 and its upper end secured to the head 60 to bias the head in one direction of annular rotation. The sleeve 56 is provided in the walls thereof with diametrically opposed cam slots 68 and 69 as seen in Figs. 1–4 having a width sufficient to receive in guided relationship cam follower lugs 70 and 71 formed integrally with the shaft 58 and head 60. Each of the lugs has an upwardly inclined camming edge 72 adapted to engage in rotary limited relationship with a complementary offset 74 in the slots 68 and 69 which open upwardly. Thus, the angular force exerted by the torsion spring 66 on the head 60 is effective to move the head 60 into a position where the lug 70 is received in the offset 74 when in its upper position with the cam 72 of the lug abutting the cam 76 defined in the offset 74. As shown in Fig. 5, in this position the elements 62 and 64 are turned in amount sufficient to permit the juicer shaft to have access to either sleeve through the apertures 52 and 54.

In order to effect ejection by means of the head 60, a manually operable plunger 78 is provided having a button 80 and a shaft 82 integrally connected therewith slidably received within a sleeve 84 positioned on the shelf 50 coaxially of the shaft 58.

The lower end of the shaft 82 carries a plunger head 86 adapted to coact with the head 60, which is preferably provided with a flat surface or button 88 for this purpose. Accordingly, as the button 80 is pressed manually downwardly, the cam 72 coacts with the cam 76 to rotate the head 60 in the direction oppositte to the direction in which it is biased by the spring 66, so as to position the lug 70 within the slot 68 and afford downward movement of the head 60. The rotational and downward movement of the head 60 as thus actuated by the button 80 is effective to place the depending actuating elements 62 and 64 in contact with the upper ends of the shafts 12 and 14; and as the lugs 70 and 71 proceed to the bottom of the grooves 68 and 69 the ends 62 and 64 move the shafts 12 and 14 downwardly so that the arcuate lugs 26 and 28 are forced past the springs 38 and 40 to release the said shafts 12 and 14 so that they can drop out.

The position of the cam 76 may be calibrated so that the heads 62 and 64 are only a slight distance above the upper ends of the beater shafts 12 and 14, while the length of the slots 68 and 69 may be such that the upper ends of the beater shafts will be moved substantially to the level of the upper ends of the sleeves 16 and 18. Thus the downward movement of the head 60 and the consequent movement of the shafts 12 and 14 will be just sufficient to declutch the blades, as hereinbefore described.

It will be appreciated that the head 60, as shown in Fig. 7 may be simplified so that the heads 62 and 64 need not be formed in depending relationship and similarly, where use of the assembly 10 for a beater alone rather than a beater mixer and juicer combination is contemplated, the slots 68 and 69 may be straight so as to eliminate camming recess 74. With such a construction, depression of the button 80 will afford direct ejection action by means of the head 60 as guided in the slots without angular rotation of the head.

Although I have herein described my invention with respect to certain specific principles and details thereof, it will be appreciated by those skilled in the art that these may be varied without departing from the spirit and scope of the invention as set forth in the hereunto appended claims.

I claim:

1. In a food mixer of the class described, a spindle, means for rotatably supporting said spindle, said spindle having an axial bore therethrough, an ejector head, a sleeve on said support means for slidably supporting said ejector head, said sleeve defining an axial slot having an offset recess at its upper end providing an inclined camming shoulder and said ejector head having a shaft received in said sleeve defining a lug adapted to be received in guided relationship in said slot and having a shoulder inclined in complementary relationship to said camming shoulder, a torsion spring biasing said ejector head upwardly in said sleeve and tending to dispose said lug in said recess, a food working tool having a shaft received in said axial bore, said shaft projecting upwardly above the spindle and a manually depressible plunger on said support means to force said ejector head to eject the shaft from said bore in response to depression of said plunger.

2. In a food mixer of the class described, a spindle, means for rotatably supporting said spindle, said spindle having an axial bore therein for receiving a beater shaft in driven relationship and an opening through the top thereof affording exposure of the end of the beater shaft, said beater shaft projecting upwardly above the spindle, an ejector head, a sleeve on said support means for slidably supporting said ejector head, said sleeve defining an axial slot, said ejector head having a guide shaft rotatably received in said sleeve and defining a lug adapted to be received in guided relationship in said slot, resilient means normally urging rotation of the guide shaft to move said lug out of alignment with said slot, and a manually depressible plunger on said support means engaging said ejector head, said ejector head being adapted to eject the beater shaft in response to depression of said plunger.

3. In a combination food mixer and juicer, a food processing tool having a driven shaft, a support structure having a pair of members in spaced parallel relationship, a pair of spindles journalled in the lower of said members having shaft receiving bores therein, the upper of said members defining a bore disposed in coaxial registration with the bore in one of said spindles to receive the driven shaft in journalled relationship in said upper bore and driven relationship in said spindle bore, an upstanding sleeve disposed between said spindles, a T-shaped ejector slidably and rotatably received in said sleeve, said ejector having the depending shaft of the T offset to provide a lug, plunger means for depressing said ejector, and means cooperating with said lug for maintaining said ejector in a position normally out of alignment relative to said coaxial bores and for rotating said ejector into alignment with said coaxial bores for movement in alignment therewith.

4. In a combination food mixer and juicer, a support structure having a pair of members in spaced parallel relationship, a pair of spindles journalled in the lower of said members having bores therein, the upper of said members defining a bore coaxially aligned with the bore in one of said spindles, a beater shaft in the other spindle bore and driven thereby, a juicer shaft in said aligned bores, an upstanding sleeve disposed between said spindles, a T-shaped ejector slidably and rotatably received in said sleeve, said ejector having the depending shaft of the T offset to provide a camming lug, plunger means for depressing said ejector, a slot formed axially in said sleeve adapted to receive said lug, said slot having a major lower portion adapted to engage said lug and dispose said ejector in alignment with said spindle bores, said sleeve defining an upper portion for said slot recessed laterally with respect to said major portion, and spring means biasing said lug into said recess, said ejector being angularly displaced relative to said bores when said lug is in said recess and said juicer shaft obstructing movement of the ejector into axial alignment with said other spindle bore.

5. In a combination food mixer and juicer, a juice shaft, a support structure having a pair of members in spaced parallel relationship, a pair of spindles having bores therein journalled in the lower of said members, the upper of said members defining a bore disposed in coaxial alignment with the bore in one of said spindles and spaced in vertical alignment therewith to receive said juicer shaft in said aligned bores across the space, an upstanding sleeve disposed between said spindles, a T-shaped ejector slidably and rotatably received in said sleeve, said ejector having the depending shaft of the T offset to provide a camming lug, plunger means for depressing said ejector, a slot formed axially in said sleeve adapted to receive said lug, said slot having a major lower portion adapted to dispose said ejector in alignment with said spindle bores in the space between the coaxially aligned bores, said sleeve defining an upper portion for said slot recessed laterally with respect to said major portion, and spring means biasing said lug into said recess, said ejector being angularly displaced relative to said bores when said lug is in said recess out of alignment with said coaxially aligned bores, said lug having a lower camming shoulder inclined to a predetermined angle relative to the axis of said shaft in said sleeve and said recess having a lower edge complementary to said camming shoulder.

6. In a food mixer of the class described, a support structure including a lower member and an upper member disposed in spaced parallel relationship thereto, a pair of spindles journalled in said lower member, each of said spindles defining an axial bore, said spindles being spaced laterally, the upper member defining a bore disposed in coaxial alignment with the bore in one of said spindles, a T-shaped ejector means having the depending shaft thereof slidably and rotatably mounted on said support structure, said means being movable into and out of alignment with said coaxially aligned bores, a beater having a shaft received in the other of said spindles provided with an arcuate, axially and radially aligned tab intermediate its ends and said spindles having a vertical slot at their lower end to receive said tab, and an annular spring on each of said journalled spindles intermediate the upper and lower ends of the slot thereof releasably engaging said tab on the lower side thereof.

7. In a food mixer of the class described, a support structure including a lower member and an upper member disposed in spaced parallel relationship thereto, a pair of laterally spaced spindles journalled in said lower member, each of said spindles defining an axial bore, two food processing tools having shafts, said spindles adaptable for receipt of said shafts, the upper member defining a bore disposed in coaxial registration with the bore in one of said spindles through which one shaft is received to engage said spindle, a T-shaped ejector having a depending shaft slidably and rotatably mounted on said support structure, said ejector being movable into and out of registration with said bores, each of said shafts having an arcuate, axially and radially aligned tab intermediate its ends, and each of said journalled spindles having a vertical slot adapted to receive said tab in releasable drive relationship, a torsion spring biasing said ejector to a position where the cross-piece of the ejector is in spaced proximate relation to one side of said one shaft.

8. In a food mixer of the class described, a support structure including a lower member and an upper member disposed in spaced parallel relationship thereto, a pair of laterally spaced spindles journalled in said lower member, each of said spindles defining an axial bore, the upper member defining a bore disposed in coaxial registration with the bore in one of said spindles, T-shaped ejector having a depending shaft slidably and rotatably mounted on said support structure, said ejector being movable selectively into registration with said coaxial bores and into angular displacement relative to said bores, each of said journalled spindles having castellated ends and an annular spring on each of said journalled spindles intermediate the upper and lower edges of the lower castellation, a torsion spring biasing said ejector to a position where the cross-piece of said ejector is in spaced proximate relation to the upper ends of said spindles, said cross-piece having depending contact elements at each end, means for maintaining said cross-piece in registration with the bores and in displaced relationship thereto, selectively, including plunger means for moving said ejector downwardly towards said spindles.

References Cited in the file of this patent

UNITED STATES PATENTS

| | | |
|---|---|---|
| 2,325,434 | Stiles | July 27, 1943 |
| 2,515,755 | Krause | July 18, 1950 |
| 2,616,732 | Schwaneke | Nov. 4, 1952 |
| 2,737,371 | Gerry | Mar. 6, 1956 |
| 2,797,901 | Seyfried | July 2, 1957 |